United States Patent
Sekino et al.

(10) Patent No.: US 10,249,982 B2
(45) Date of Patent: Apr. 2, 2019

(54) POWER SUPPLY DEVICE

(71) Applicant: Yazaki Corporation, Tokyo (JP)

(72) Inventors: Tsukasa Sekino, Shizuoka (JP); Shinji Kato, Shizuoka (JP); Shougo Hasegawa, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/719,035

(22) Filed: Sep. 28, 2017

(65) Prior Publication Data

US 2018/0151979 A1 May 31, 2018

(30) Foreign Application Priority Data

Nov. 25, 2016 (JP) .................. 2016-228581

(51) Int. Cl.
*H01R 13/53* (2006.01)
*B60R 16/02* (2006.01)
(Continued)

(52) U.S. Cl.
CPC ......... *H01R 13/53* (2013.01); *B60R 16/0207* (2013.01); *B60R 16/027* (2013.01); *B60R 16/0215* (2013.01); *B60R 16/03* (2013.01); *H01R 13/631* (2013.01); *H01R 13/72* (2013.01); *H01R 13/46* (2013.01); *H01R 24/20* (2013.01); *H01R 2107/00* (2013.01); *H01R 2201/26* (2013.01)

(58) Field of Classification Search
CPC ................................. H01R 2201/02
USPC .......................... 439/34, 528, 910
See application file for complete search history.

(56) References Cited

U.S. PATENT DOCUMENTS 4,815,984 A * 3/1989 Sugiyama ........... B60R 16/0239
174/72 A
6,336,832 B2 * 1/2002 Nobe ................... H01R 13/112
439/578
(Continued)

FOREIGN PATENT DOCUMENTS

JP 10-112922 A 4/1998
JP 2005-176436 A 6/2005
(Continued)

OTHER PUBLICATIONS

JP2011025743A_translate.*
Japanese Office Action for the related Japanese Patent Application No. 2016-228581 dated Oct. 23, 2018.

*Primary Examiner* — Tulsidas C Patel
*Assistant Examiner* — Marcus E Harcum
(74) *Attorney, Agent, or Firm* — Kenealy Vaidya LLP (57) ABSTRACT

Provided is a power supply device capable of improving workability during assembly and mounting. Accommodating a power source side connector by a cylindrical portion of a case makes a portion where the power source side connector of the harness is provided not pulled out to the outside of the case. Thus the workability at the time of assembling the power feeding device itself can be improved. Also, it is unnecessary to dispose the power source side connector where the passenger unlikely steps on, and simply mating the mating connector with the source side connector makes the workability at the time of mounting the power supply device on the vehicle improved.

5 Claims, 5 Drawing Sheets

(51) Int. Cl.
    *B60R 16/03* (2006.01)
    *H01R 13/631* (2006.01)
    *H01R 13/72* (2006.01)
    *B60R 16/027* (2006.01)
    *H01R 13/46* (2006.01)
    *H01R 24/20* (2011.01)
    *H01R 107/00* (2006.01)

(56) References Cited

U.S. PATENT DOCUMENTS

| | | | | |
|---|---|---|---|---|
| 6,558,199 B2 * | 5/2003 | Oguchi | ............... | H01R 12/721 |
| | | | | 439/630 |
| 7,049,509 B2 | 5/2006 | Terada | | |
| 7,097,481 B2 | 8/2006 | Terada | | |
| 7,134,921 B2 * | 11/2006 | Siracki | ............... | H01R 4/305 |
| | | | | 439/798 |
| 7,361,039 B2 * | 4/2008 | Koehler | ............... | H01R 13/629 |
| | | | | 362/431 |
| 2003/0228792 A1 * | 12/2003 | Lanni | ............... | H01R 31/065 |
| | | | | 439/528 |
| 2006/0027391 A1 * | 2/2006 | Tsubaki | ............... | B60R 16/0215 |
| | | | | 174/72 A |
| 2007/0087635 A1 * | 4/2007 | Terada | ............... | B60N 2/06 |
| | | | | 439/701 |
| 2009/0200062 A1 * | 8/2009 | Aoki | ............... | B60R 16/0215 |
| | | | | 174/136 |
| 2014/0231131 A1 * | 8/2014 | Sekino | ............... | H01B 7/0045 |
| | | | | 174/542 |

FOREIGN PATENT DOCUMENTS

| | | | | |
|---|---|---|---|---|
| JP | 2005-176539 A | | 6/2005 | |
| JP | 2011025743 A | * | 2/2011 | ............... B60N 2/06 |
| JP | 2016-136811 A | | 7/2016 | |

* cited by examiner

POWER SUPPLY DEVICE

TECHNICAL FIELD

The present invention relates to a power supply device provided on a vehicle floor for supplying power to a slide body.

BACKGROUND ART

Generally, when electrical equipment is provided on a slide body such as a slide seat of a vehicle, a power supply device is provided for supplying electric power from a power supply such as a battery mounted on the vehicle to an electric equipment. Such power supply device includes a wire harness for electrically connecting the power supply and the electrical equipment, and a case for accommodating the harness, and the wire harness is accommodated in the case or is drawn out from the case in response to a sliding movement of the slide body. At the end of such wire harness on the power source side end, a connector is provided, which fits in a mating connector connected to the power supply, which results in the power supply and the wire harness being electrically connected.

In order to connect the wire harness to the power supply in this manner, it is necessary to draw out a portion of the wire harness where the power source side connector is provided to the outside of the case. However, when conveying the electric device, the portion of the wire harness drawn out of the case becomes impeditive, resulting in a decrease in the workability of the conveying operation in some cases. So, there has been proposed a structure in which a wire harness is temporarily fixed to a case by clamping (see, for example, Patent Document 1). Using the wire harness temporary fixing structure described in Patent Document 1 makes the wire harness avoid becoming impeditive, and workability of carrying work improve.

CITATION LIST

Patent Document

Patent Document 1: Japanese Patent Application Laid-Open No. 2016-136811

SUMMARY OF THE INVENTION

Problems to be Solved by the Invention

Incidentally, as described above, the power supply device for supplying electric power to the slide body is provided on the vehicle floor, and thus a load (pressure) may be applied by a passenger's stepping on. The case containing the wire harness is configured to withstand such a load. On the other hand, it was difficult for the connector on the power source side provided on the wire harness to have strength enough to withstand the load. Therefore, it is conceivable that appropriate arrangement of the wire harness on the vehicle floor makes the connector located at a position where the passenger unlikely steps on.

However, when attempting to arrange the connector at an appropriate position in this manner, the portion of the wire harness drawn out from the case becomes longer. Application of the temporary fixation as in Patent Document 1 can suppress the deterioration of the workability at the time of transportation, but workability at the time of standstill of the power supply device decreases and the workability at the time of mounting the power supply device on the vehicle is deteriorated.

An object of the present invention is to provide a power supply device capable of improving workability at the time of assembly and mounting.

Means for Solving the Problems

In order to solve the above-mentioned problems and achieve the object, the invention described in a first aspect is a power supply device provided on a vehicle floor for supplying power to a slide body, and includes: a wire harness for electrically connecting the power source of the vehicle and the slide body; and a case accommodating the wire harness, and the wire harness includes a power source side connector fittable to a mating connector on a power source side end thereof, and the case has a connector housing accommodating the power source side connector.

According to a second aspect of the invention, in the invention according to the first aspect, the power source side connector is arranged fittable to the mating connector in a direction along the vehicle floor as a fitting direction, and the connector housing has a protection portion covering the power source side connector from above.

According to a third aspect of the present invention, in the second aspect of the invention, the case has a harness housing for accommodating the wire harness, and an upper surface of the harness housing and an upper surface of the protecting portion are disposed on the same plane.

According to a fourth aspect of the present invention, in the second or third aspect, an opening is formed on the case, the opening allowing for visibly recognizing the power source side connector by opening in a direction intersecting with the fitting direction.

According to a fifth aspect of the invention, in any one of the second to fourth aspects of the invention, the connector housing includes a cylindrical portion surrounding the power source side connector and extending along the fitting direction, and the cylindrical portion extends from the power source side connector to an opposite side of the wire harness and has a notch portion in which a part of a cylinder is notch.

Advantages of the Invention

According to the first aspect of the present invention, since the power source side connector is accommodated in the connector housing of the case, the portion of the wire harness where the power source side connector is provided is drawn out outside the case. Therefore, workability at the time of assembling the power supply device itself can be improved. Also, the connector need not be arranged where the passenger unlikely steppes on the connector, and the mating connector is simply fitted in the power source side connector, so that workability at the time of mounting the power supply device on the vehicle is improved. At this time, it is relatively easy to manufacture the case that can withstand the stepping of the passenger, and therefore accommodating the power source side connector in such a case can protect the source side connector from the load.

According to the second aspect of the present invention, since the power source side connector is covered from above by the protection portion, it is possible to protect the power source side connector from stepping on by the passenger.

According to the third aspect of the present invention, since the upper surface of the harness accommodating portion and the upper surface of the protecting portion are coplanar, it makes it easier to protect the power source side connector from stepping on by the passenger.

According to the fourth aspect of the invention, since the power source side connector can be visibly recognized from the opening formed in the case, it is possible to visibly confirm the mating condition between the power source side connector and the mating connector. And the locking portion such as a locking arm is provided on the power source side connector or the mating connector, it is possible in a configuration in which fitting is maintained by locking to insert a finger, a jig or the like from the opening and release the locking, allowing for easily releasing the mating connector.

According to the fifth aspect of the present invention, the portion of the cylindrical portion extending to the opposite side of the wire harness can guide as a guiding part the mating connector at the time of mating. Further, the notch formed at the cylindrical portion can secure a space at the time of fitting.

DETAILED DESCRIPTION OF THE INVENTION

Figure 1:
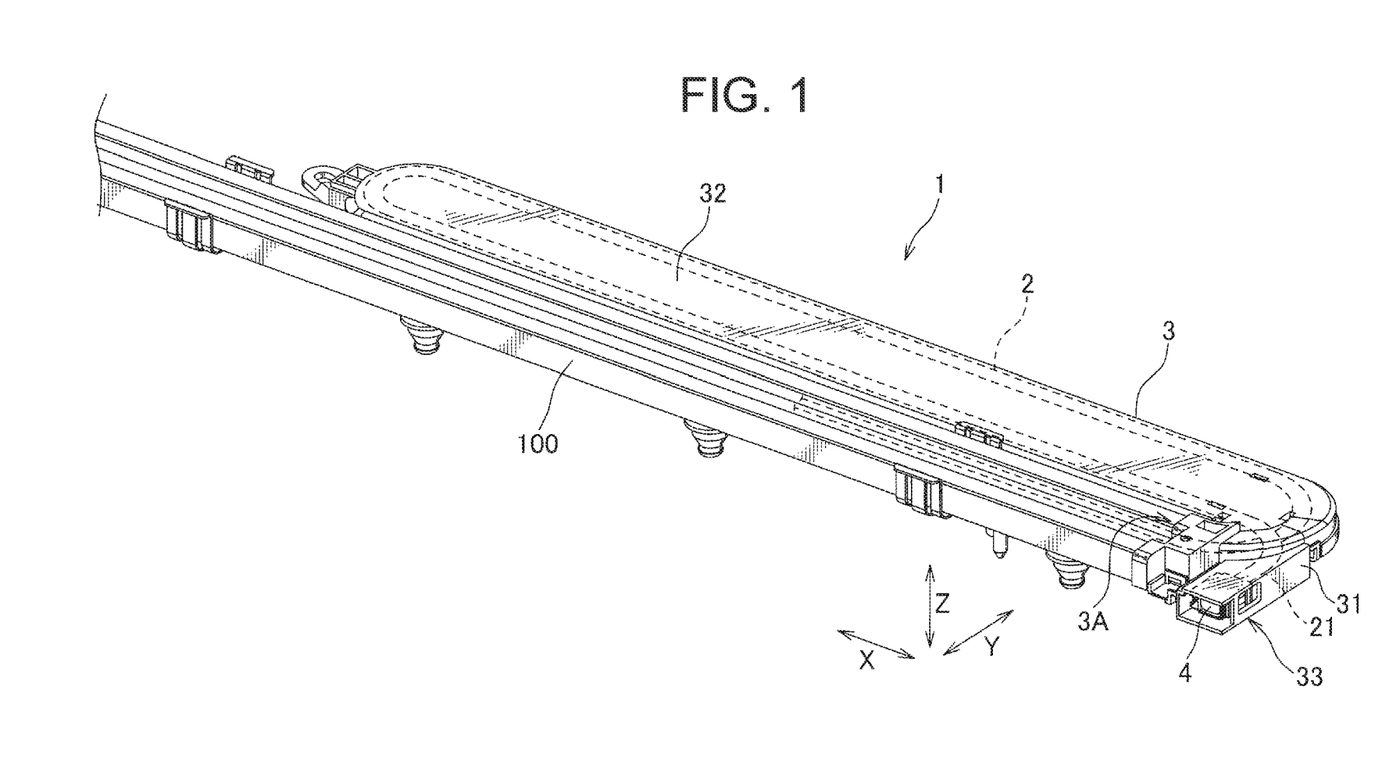
FIG. 1 is a perspective view showing a power supply device according to an embodiment of the present invention.
Figure 3:
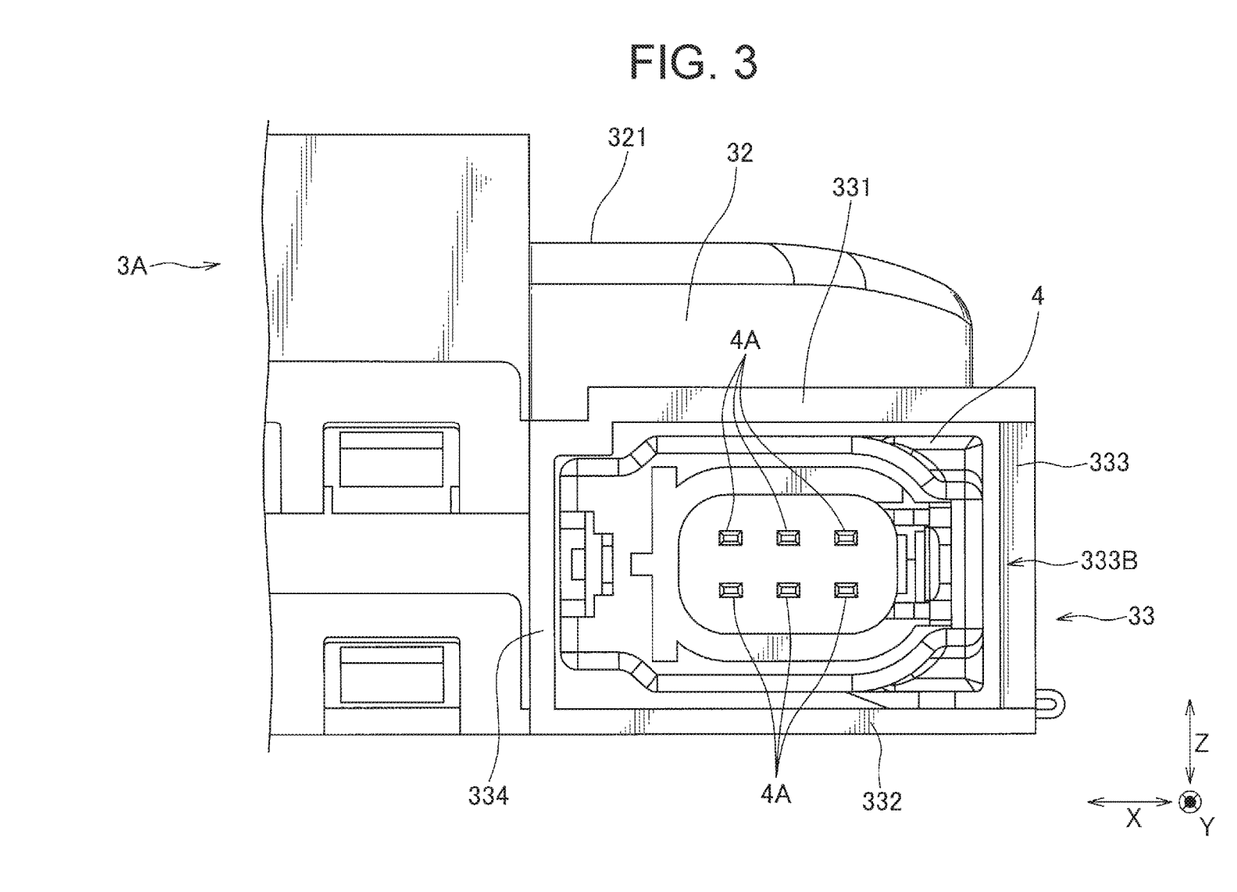
FIG. 3 is a side view showing the power supply device.
Figure 4:
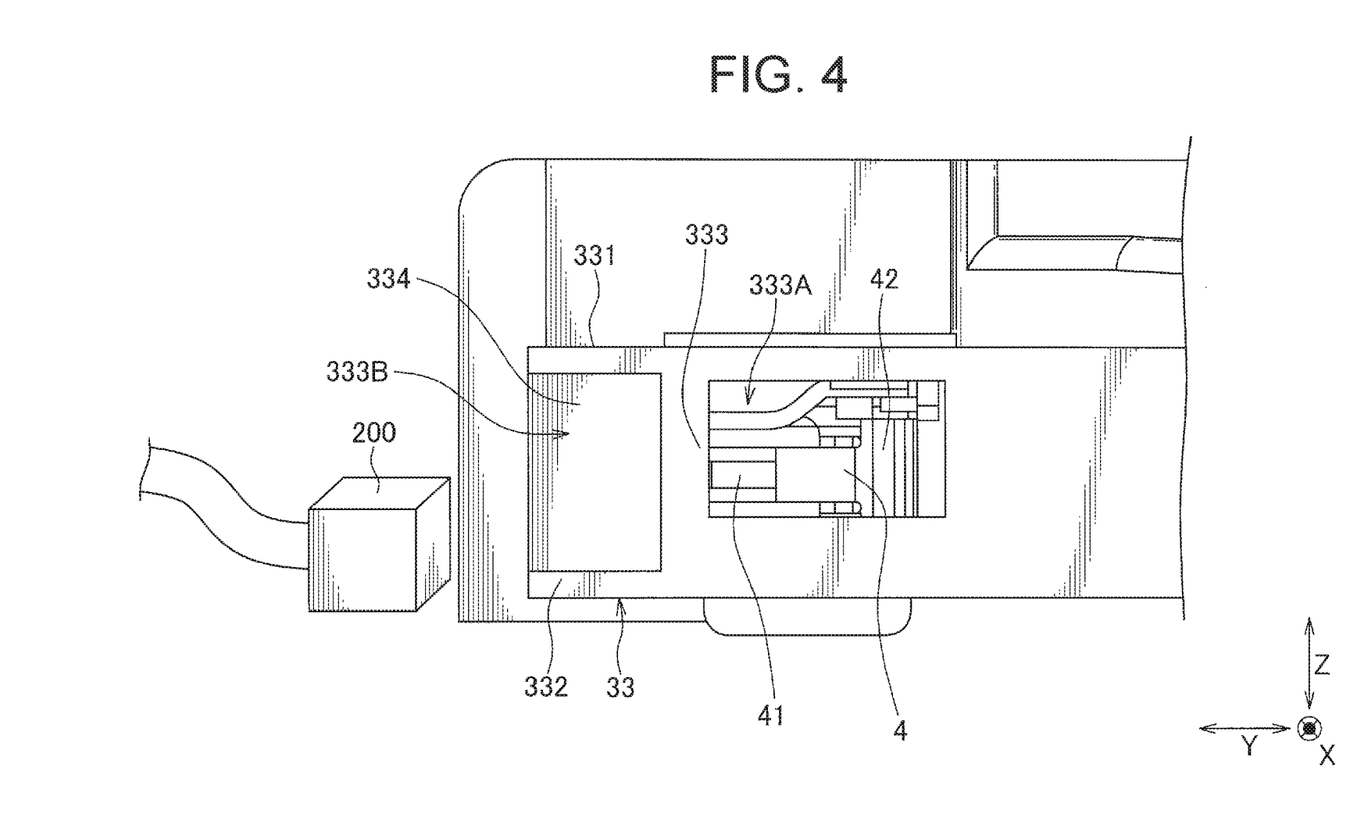
FIG. 4 is a rear view showing the power supply device.

Embodiments of the present invention will be described below with reference to the drawings. FIG. 1 is a perspective view showing a power supply device 1 according to an embodiment of the present invention, FIG. 2 is a perspective view showing an enlarged main part of the power supply device 1, FIG. 3 is a side view showing the power supply device 1, and FIG. 4 is a rear view showing the power supply device 1.

Figure 2:
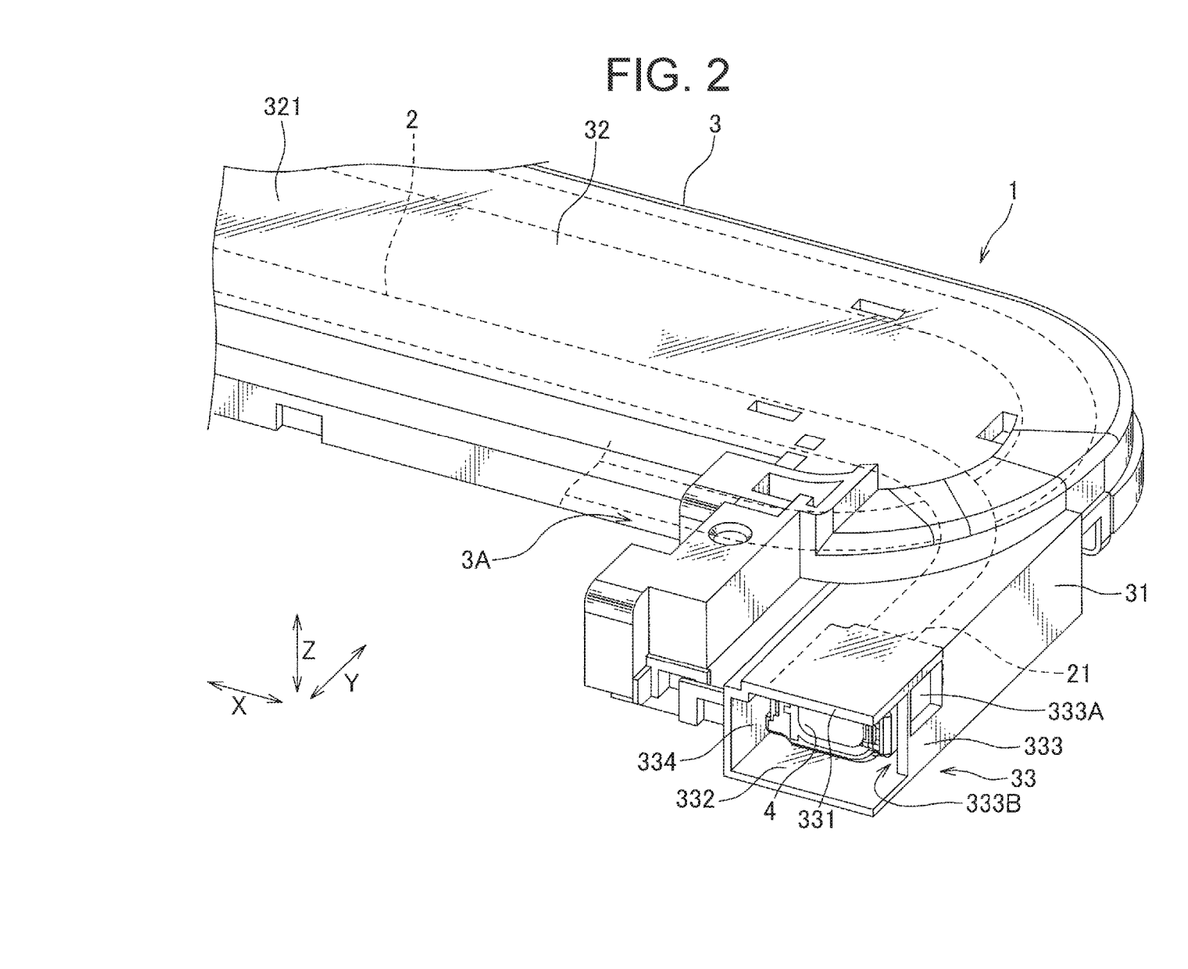
FIG. 2 is an enlarged perspective view showing a main part of the power supply device.

The power supply device 1 of the present embodiment is what is provided on a vehicle floor and supply power to a slide seat as a slide body, and as shown in FIGS. 1 and 2, includes a wire harness 2 and a case 3. In the present embodiment, the longitudinal direction of the vehicle is defined as X direction, the width direction of the vehicle Y direction, and the vertical direction the Z direction. That is, the XY plane is a surface along the vehicle floor.

The wire harness 2 is housed in the case 3 having an appropriate shape, and a load side end is led out from a load side lead-out portion 3A of the case described later, and a power source side connector 21 includes a power source side connector 4. The portion of the wire harness 2 led out from the load side lead-out portion 3A is wired through a seat rail 100 which guides a slide seat toward the slide seat. As the slide seat slides and a seat position changes, the length of the wire harness 2 led out from the load side lead-out portion 3A changes. Although FIGS. 1 and 2 show one wire harness, the wire harness 2 may be composed of a plurality of wire harnesses.

The load side end portion of the wire harness 2 is electrically connected to electrical equipment (for example, an electrically moving mechanism for sliding the slide seat, a massage machine, a speaker etc). A mating connector 200 fits in the power source side connector 4 in the Y direction as described later. The mating connector 200 is what is disposed at the tip of the wire harness extending from a power source of a battery or the like mounted on the vehicle. As a result, the electrical equipment of the slide seat is connected to the power supply via the wire harness 2, and electric power is supplied.

The case 3 is formed in a rectangular round plate shape along the XY plane and in the X direction as the longitudinal direction, and is provided so as to be adjacent to the seat rail 100 extending along the X direction. When the slide sheet is guided by the two side-by-side seat rails 100 in the Y direction, the case 3 may be provided between the two seat rails 100.

The case 3 includes a base portion 31 to be placed on the vehicle floor, and a cover portion 32 covering the base portion 31 from above, and a receiving space is formed for accommodating the wire harness 2 between the base portion 31 and the cover portion 32. That is, the portion of the base portion 31 excluding the cylindrical portion 33, which will be described later, and the cover portion 32 constitute a harness housing for accommodating the wire harness 2. The base portion 31 and the cover portion 32 are made of, for example, an insulating resin.

On one end side in the X direction of the case 3 (for example, on the rear side), formed is a load side lead-out portion 3A that is capable of deriving the wire harness 2 by opening toward the other end side. The load side lead-out portion 3A is provided continuous with one end of the wire 100, and the wire harness 2 led out from the load side lead-out portion 3A is configured to be introduced into the seat rail 100.

On one end side of the base portion 31, as shown also in FIG. 3, formed is a cylindrical portion 33 as a connector housing accommodating the power source side connector 4. The power source side connector 4 has a plurality of terminal insertion holes 4A which extends along the Y direction and into which the male terminals of the mating connector 200 are inserted. Note that the power source side connector 4 may have the male terminal. The cylindrical portion 33 has an upper plate portion 331, a lower portion plate 332, and a pair of standing wall portions 333, 334, and is formed into a rectangular tube shape, surrounding the power source side connector from all sides. In addition, the upper plate portion 331, the lower plate portion 332 and the upstanding wall portions 333 and 334 constituting the cylindrical portion 33 extend along the Y direction, and open so that the mating connector 200 is connectable to the power source side connector 4. Further, the upper plate portion 331, the lower plate portion 332, and the standing wall portion 334 extend in the Y direction from the power source side connector 4 toward the opposite side of the wire harness 2.

The upper plate portion 331 has an appropriate thickness and is held by the pair of standing wall portions 333, 334, so as to be hardly deformed by the load from above. That is, the upper plate portion 331 functions as a protection portion that covers and protects the power source side connector 4 from above.

On the standing wall portion 333 on one side in the X direction, an opening portion 333A and the notch portion 333B are formed as shown in FIG. 4. In FIG. 4, the mating connector 200 is schematically shown. The notch portion 333B is formed such that only the standing wall portion 333 does not protrude from the power source side connector 4 to the opposite side of the wire harness 2. That is, the notch portion 333B is generally formed in the vertical direction of the standing wall portion 333 (Z direction).

The opening portion 333A is configured so that the power source side connector 4 accommodated in the cylindrical portion 33 can be visibly recognized. Since the opening portion 333A, because of being formed in the standing wall portion 333, opens in the X direction (a direction crossing the fitting direction on the plane along the vehicle floor). The power source side connector 4 has a locking arm 41 for locking the mating connector 200. On the locking arm 41, an operation portion 42 for releasing locking is provided. The locking arm 41 and the operation section 42 can be visibly recognized from the opening portion 333A, and the operation section 42 is pressed to release the engagement of the mating connector 200 by the locking stop arm 41.

The upper plate portion 331, the lower plate portion 332, and the standing wall portion 334 where the notch portion 333B is not formed guides the mating connector 200 in the Y direction when fitting the mating connector 200 into the power source side connector 4 in the Y direction, functioning as a guide unit. The mating connector 200 need not abut on all of the plate portion 331, the lower plate portion 332, and the standing wall portion 334, but may be guided by at least one of them.

The upper surface 321 of the cover portion 32 is formed in a flat shape, and becomes the upper surface of the harness housing, and a floor mat is placed. The upper plate portion 331 as a protection portion formed in the case 3 is disposed below the upper surface 321.

Here, a method of fitting the power source side connector 4 and the mating connector 200 will be described. The operator grips the mating connector 200 with fingers or jigs, and while guiding the mating connector 200 along the upper plate portion 331, the lower plate portion 332, and the standing wall portion 334 of the cylindrical portion 33, inserts it into the cylindrical portion 33. At this time, since the notch portion 333B is formed, the workspace is secured. By further inserting the mating connector 200 into the cylindrical portion 33, the mating connector 200 is fitted to the power source side connector 4. The operator, by visual inspection from the opening portion 333A, confirms whether the mating connector 200 is sufficiently inserted and is correctly fitted into the power source side connector 4 (that is, it is locked by the locking arm 41).

Note that when removing the mating connector 200, fingers or jigs is inserted from the opening portion 333A, the operation portion 42 is pressed, the locking arm 41 is deformed so as to release the locking, and the mating connector 200 may be pulled out.

According to this embodiment as described above, the following effects are obtained. That is, since the power source side connector 4 is accommodated in the cylindrical portion 33 of the case 3, the portion of the wire harness 2 in which the power source side connector 4 is provided is not drawn out of the case 3. Therefore, workability when assembling the power feeding device 1 can be improved. Also, the power source side connector 4 need not be arranged where a passenger unlikely steps on, the mating connector 200 may be simply fitted in the power source side connector 4, and workability at the time of mounting the power supply device 1 on the vehicle can therefore improve. At this time, it is easy to manufacture the case 3 which can withstand the passenger's stepping on, and accommodation of the power source side connector 4 in such case 3 can protect the power source side connector 4 from the load.

In addition, since the power source side connector 4 is covered from above by the upper plate portion 331 of the cylindrical portion 33, it is possible to protect the power source side connector 4 from stepping on by the passenger.

Further, since the power source side connector 4 can be visibly recognized from the opening portion 333A formed in the case 3, the state of engagement between the power source side connector 4 and the mating connector 200 is visibly checked, and mating failure can be suppressed. Further, since fingers, jigs or the like is inserted from the opening portion 333A so that the locking by the locking arm 41 of the power source side connector 4 can be released, the mating connector 200 can be easily removed.

Further, since at least the upper plate portion 331, the lower plate portion 332 and the standing wall portion 334 of the cylindrical portion 33 guide as the guide portion the mating connector 200 at the time of fitting, the workability at the time of fitting can be improved. Further, since the notch portion 333B is formed in the cylindrical portion 33, the work space at the time of fitting can be secured.

It is to be noted that the present invention is not limited to the above embodiment, includes other configurations where the object of the present invention can be achieved, and the following modifications and the like are included in the present invention.

For example, in the above embodiment, the upper surface of the upper plate portion 331 of the cylindrical portion 33 (the upper surface of the protector covering the power source side connector 4 from above) is arranged below the upper surface 321 of the cover portion 32 (the upper surface of the harness housing accommodating the wire harness), but the upper surface of the protecting portion may be disposed on substantially the same plane as the upper surface of the harness housing.

Figure 5:
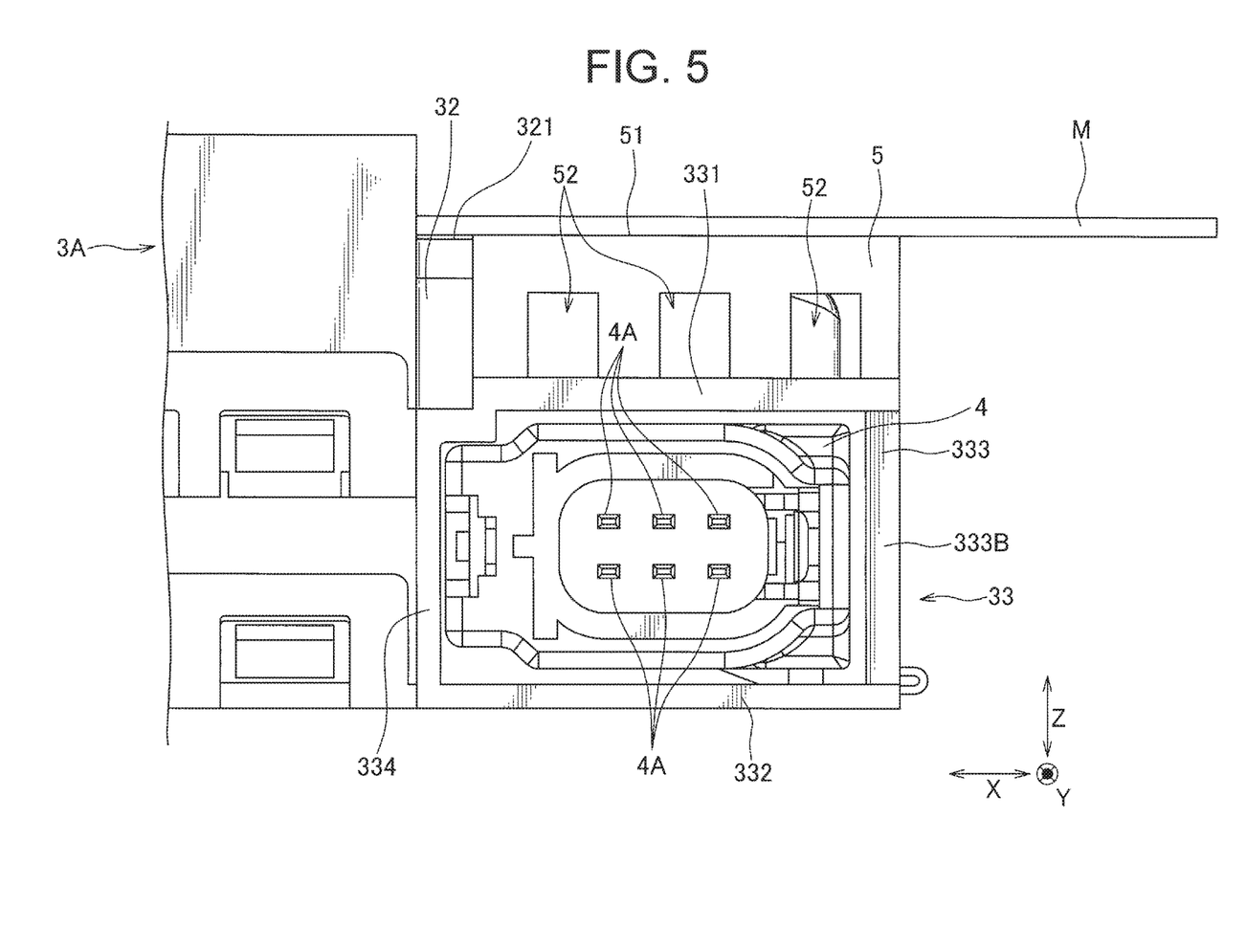
FIG. 5 is a side view showing a power supply device according to a modified example of the present invention.

That is, for example, as shown in FIG. 5, a raising member 5 may be configured to be placed on the upper surface of the upper plate portion 331. At this time, the raising member 5 and the upper plate portion 331 serves as a protector covering the power source side connector 4 from above, the upper surface 51 (the upper surface of the protector) of the raising member 5 is located on substantially the same plane as the upper surface 321. In FIG. 5, a floor mat M is shown placed on the upper surface 51 and the upper surface 321. The raising member 5 is made of, for example, an insulating resin, and lightened portion 52 is formed. Forming of the lightened portion 52 prevents sinks such as depressions due to shrinkage when the resin member is cooled from occurring, which suppresses deterioration of the design. In addition, the lightened portion 52 may be formed in a slit shape or may be formed in a mesh shape, and may not be formed in the case where the raising member 5 is thin.

In this way, since the upper surface of the protection portion is arranged on substantially the same plane as the upper surface of the harness accommodating portion can suppress the application of the load locally only to the protection part, distribute the load also to the harness housing, and allows for easily protecting the power source side connector 4. Also, formation of irregularities can be suppressed when the floor mat is placed on the top surface of the protective part, achieving appearance with less sense of incongruity. Incidentally, the upper plate portion is formed thick (that is, the upper plate portion and the raising member are formed integrally), so that the upper surface of the upper plate portion and the upper surface of the harness housing may be substantially arranged on the same plane. When forming the upper plate portion thick as described above, the lightened portion opening toward the lower surface side of the portion of the upper plate may be formed.

Further, in the above embodiment, while the upper plate portion 331 of the cylindrical portion 33 of the base portion 31 functions as a protection portion covering the power source side connector 4 from above, a part of the cover portion may function as a power source side connector by covering the connector 4 from above. In addition, the cylindrical portion may not be composed of only the base portion, and for example the cover portion may include the upper plate portion and the base parts may have other three walls as well.

Further, in the above embodiment, the cylindrical portion 33 surrounding the power source side connector 4 extends from the power source side connector 4 to the opposite side of the wire harness 2, but the cylindrical portion may not be extended. That is, the opening of the cylindrical portion and the opening of the power source side connector 4 may be arranged at approximately the same position in the fitting direction. According to such a configuration, the mating connector 200 can be easily fitted in the power source side connector 4. The power source side connector 4 may not be housed in the cylindrical portion. That is, the power source side connector 4 is positioned at an appropriate position in the case 3, and at least the upper side may be covered by the protection part.

In the above embodiment, the case 3 is provided with an opening portion 333A formed to be visibly recognized, but when the engagement between the power source side connector 4 and the mating connector 200 can be recognized in other way (for example, by changes in response or sound when locking is completed, or by judgment of completion of the fitting by a position of a mark made on the mating connector 200), the opening portion may not be formed.

Further, in the above embodiment, the notch portion 333B is formed along the entirety in the vertical direction (Z direction) of one standing wall portion 333 of the cylindrical portion 33, but in accordance with a necessary work space, the notch portion may be formed in another wall constituting the cylindrical portion. Also, the notch portion is formed in the entire wall, or may be formed by cutting out only a part of the wall. Also, even if the work space is small but the mating connector 200 can be fitted in the power source side connector 4, the notch need not be formed.

Further, in the above embodiment, while the power source side connector 4 is accommodated in the cylindrical portion 33 of the case 3 in the Y direction along the vehicle floor as the fitting direction, the power source side connector may be fitted in the other direction as a joining direction in the connector housing of the case. For example, in the case where there is a sufficient space on the lower side of the power supply device, the connector housing opening downward is provided in the case, and the mating connector 2 is moved from the lower side to the upper side with the Z direction as the fitting direction as well, which may be configured to be fitted to the power source side connector.

In addition, the best configurations, methods, and the like for carrying out the present invention are disclosed in the above description, however, the present invention is not limited to this. That is, although the present invention is mainly illustrated and described with respect to a specific implementation, it is to be understood that without departing from spirit and scope of the invention, various modifications can be made by those skilled in the art with respect to the above-described embodiments in the shape, material, quantity, other detail configurations. Therefore, since the description that limits the shape and material disclosed is illustratively described in order to facilitate the understanding of the present invention, and does not limit the present invention, the description in the name of a member of which part or all of the definite part on the shape, material, etc is excluded is included in the present invention limitations.

EXPLANATION OF SIGN 1 power supply device
2 wire harness
21 power supply end
3 case
321 top surface of harness housing
33 cylindrical portion (connector housing portion)
331 upper plate part (protective part)
333A opening portion
333B notch portion
4 power source side connector
200 mating connector

The invention claimed is:

1. A power supply device provided on a vehicle floor for supplying power to a slide body, comprising:
    a wire harness for electrically connecting a power source of the vehicle and the slide body; and
    a case accommodating the wire harness, wherein
    the case includes a base portion and a cover portion, and
    the wire harness includes a power source side connector fittable to a mating connector on a power source side end thereof, and wherein
    a connector housing accommodating the power source side connector is formed at one end of the base portion,
    the power source side connector is arranged fittable to the mating connector in a direction along the vehicle floor as a fitting direction, and wherein
    the connector housing has a protection portion covering the power source side connector from above, and
    a raising member is placed on an upper support surface of the protection portion, the raising member is configured to be in size such that an upper surface of the cover portion and an upper surface of the raising member lie in the same plane.

2. The power supply device according to claim 1, wherein the connector housing has an opening formed thereon, the opening, by opening in a direction intersecting with the fitting direction, allowing for visibly recognizing the power source side connector.

3. The power supply device according to claim 1, wherein the connector housing includes a cylindrical portion surrounding the power source side connector and extending along the fitting direction, and wherein the cylindrical portion extends from the power source side connector to an opposite side of the wire harness and has a notch portion in which a part of a cylinder is notch.

4. The power supply device according to claim 2, wherein the connector housing includes a cylindrical portion surrounding the power source side connector and extending along the fitting direction, and wherein the cylindrical portion extends from the power source side connector to an opposite side of the wire harness and has a notch portion in which a part of a cylinder is notch.

5. The power supply device according to claim 1, wherein the case includes a load side lead-out portion and the wire harness exits the case through the load side lead-out portion.

* * * * *